(No Model.)  2 Sheets—Sheet 1.
C. D. HUNKING.
HOT WATER DRAFT TUBE.
No. 438,813.  Patented Oct. 21, 1890.
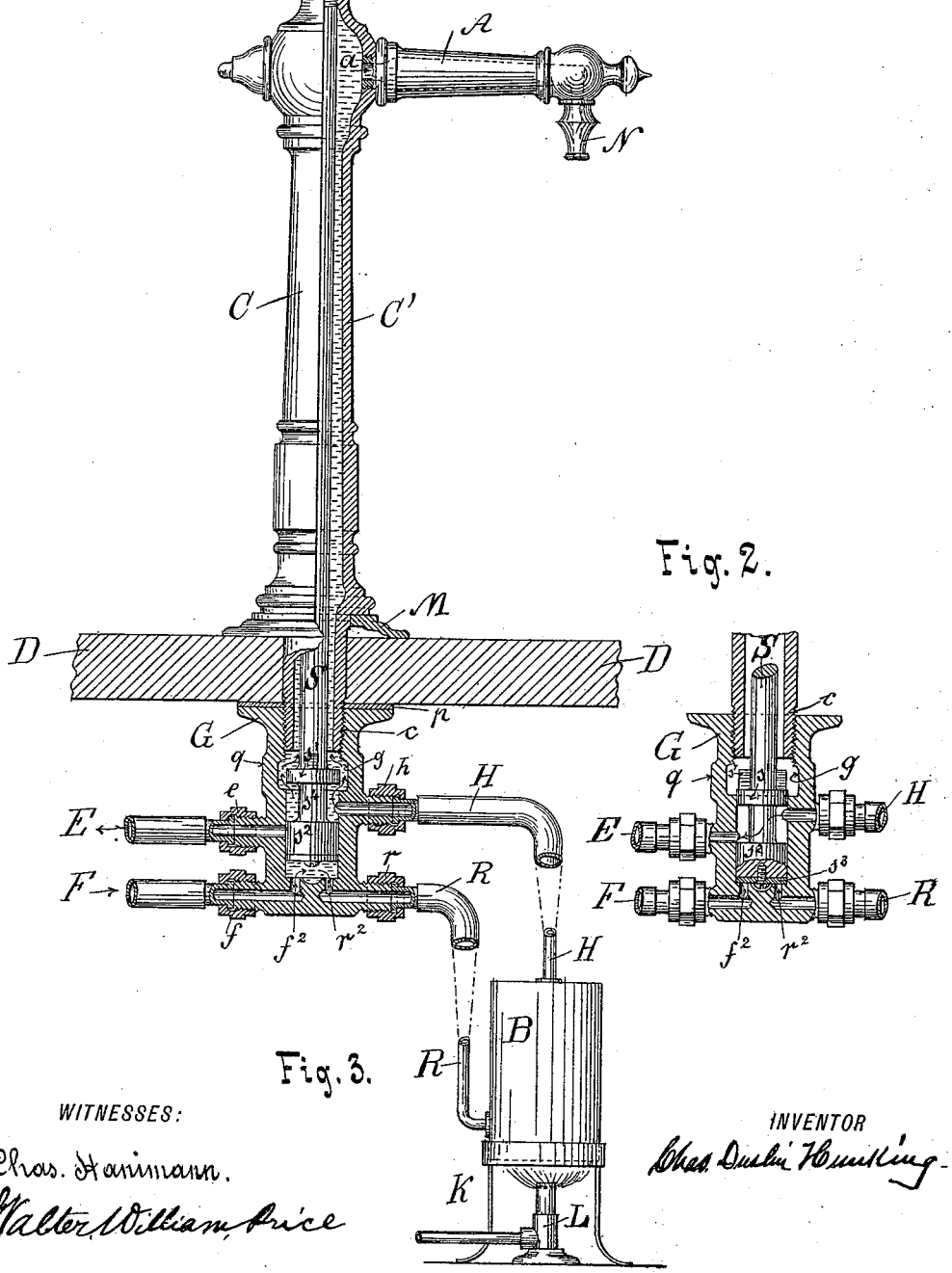
WITNESSES:
Chas. Hanimann.
Walter William Price.
INVENTOR
Chas. Dunkin Hunking.

(No Model.) 2 Sheets—Sheet 2.

C. D. HUNKING.
HOT WATER DRAFT TUBE.

No. 438,813. Patented Oct. 21, 1890.

WITNESSES:
Chas. Hanimann.
Walter William Price

INVENTOR
Chas. Dustin Hunking.

UNITED STATES PATENT OFFICE.

CHARLES DUSTIN HUNKING, OF NEW YORK, N. Y.

HOT-WATER DRAFT-TUBE.

SPECIFICATION forming part of Letters Patent No. 438,813, dated October 21, 1890.

Application filed November 9, 1889. Serial No. 329,806. (No model.)

*To all whom it may concern:*

Be it known that I, CHARLES DUSTIN HUNKING, a citizen of the United States, residing at New York, county of New York, and State of New York, have invented a new and useful Hot-Water Draft-Tube, for use in drawing hot water as a beverage or for other purposes, of which the following is a specification.

My invention relates to apparatus for heating and drawing water from a receptacle or heater, connected with a supply of water under pressure by means of a convenient apparatus or draft-tube, in a simple, safe, and automatic manner.

The objects of my invention are, first, in heating the water to avoid, as far as possible, all pressure on the boiler or heater, either of water or steam; to prevent explosions or leakage by controlling, with the draft-tube, the supply of water before it reaches the heater, and by allowing the steam to escape into the waste-pipe through the draft-tube; second, to prevent the steam from the heater from escaping into the room by carrying it off through the waste-pipe; third, preparatory to drawing hot water to waste the water cooled by standing in the pipe carrying hot water from the heater to the draft-tube, in order that the water may immediately run hot. These objects I attain by the mechanism in the draft-tube and its connections with a heater supplied with water under pressure, in the manner shown by the accompanying drawings, in which—

Figure 4:
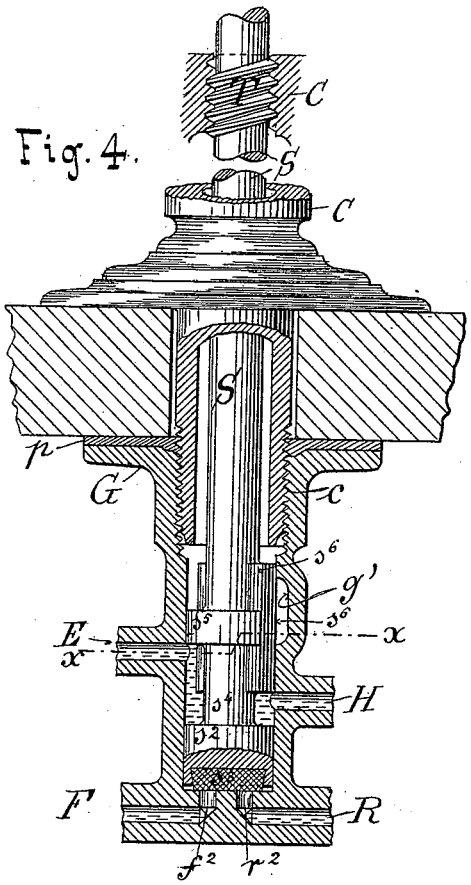
Figure 5:
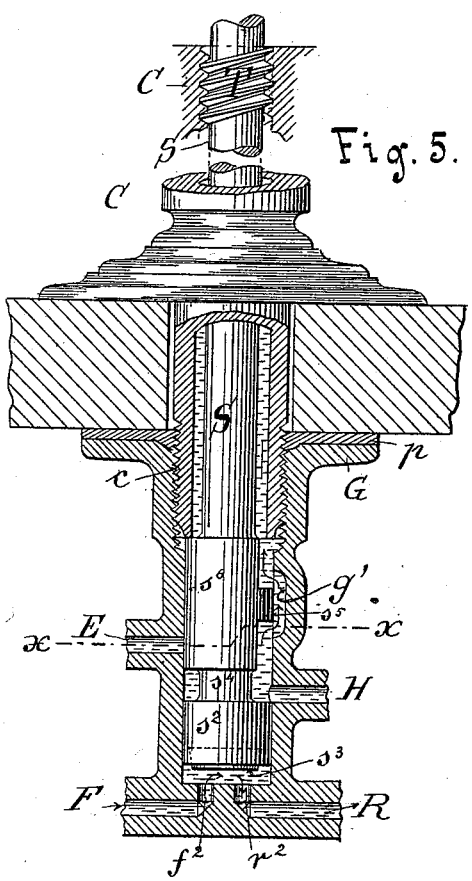
Figure 6:
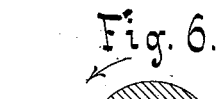
Figure 7:
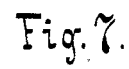
Figure 8:
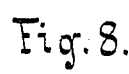

Figure 1 is an elevation of the draft-tube with a partial vertical section of the same, and a vertical section of the cap with the piston-stem and the pistons shown in the position they assume when the draft-tube is open. Fig. 2 is a vertical section of the cap, showing the pistons when the draft-tube is closed. Fig. 3 is the heater with its stand and the lamp for heating drawn on a reduced scale. Figs. 4 and 5 are vertical sections of the cap, showing the pistons and neck of the draft-tube, with the cap and pistons slightly modified in form and on an enlarged scale from those shown in Figs. 1 and 2. The compression-screw on the piston-stem is also shown in Fig. 4. Figs. 6, 7, and 8 are horizontal sections of the cap and pistons at $x$ $x$, Figs. 4 and 5, showing the positions of the pistons when the draft-tube is in a closed, intermediate, or open position.

Similar letters refer to similar parts throughout the several views.

The draft-tubes C C', of which A is the arm and N the nozzle, is supported by the counter D. The cap G is screwed to the neck $c$ of the draft-tube. The pipe F is connected with the main supply of water under pressure, the pipe E with the waste-pipe, and the pipes H and R with the heater B.

K is the stand to support the heater, and L the lamp for heating the water. The piston-stem S $s^4$, turning on the compression-screw T, controls the movements of the pistons in the cap G by means of the wheel W.

P is the stuffing-box of the draft-tube, and $u$ the packing of the same. $p$ is a washer between the cap and the counter.

M is a vertical section of a flange at the base of the draft-tube. $q$ is a portion of the cap with polygonal sides for the application of a wrench. $e f h r$ are couplings of the pipes E, F, H, and R. The pipes F and R may be placed at any convenient angle to the pipes E and H.

I prefer to carry out the principal feature of my invention by the form of pistons shown in Figs. 4 and 5, which controls the ports in the cap in a more expeditious manner.

When the draft-tube is closed, Fig. 4, the passage through the channel $g'$ and to the nozzle of the draft-tube is closed by the pistons $s^5$ $s^6$. The piston $s^2$ (with the washer $s^3$) closes the ports $f^2$ $r^2$ and shuts off the supply of water to the heater. The waste-pipe E is then open for the escape of steam from the heater through the pipe H around $s^4$. Thus both steam and water pressure on the heater are removed. When the draft-tube is open, Fig. 5, the water passes through the pipe F, the ports $f^2$ $r^2$, and the pipe R to the heater B; thence through the pipe H, around the piston $s^5$, through the channel $g'$, and thence out the nozzle of the draft-tube. The waste-pipe E is then closed by the piston $s^6$. By slightly opening the draft-tube the water cooled by standing in the pipe H may be forced out through the waste-pipe. In the form of pistons shown in Figs. 1 and 2, $s^2$ controls the ports $f^2\ r^2$ and the waste-pipe E, and $s'$ controls the channels $g'$.

What I do claim as my invention, and desire to secure by Letters Patent, is—

1. A draft-tube having the piston-stem S $s^4$, with the compression-screw T, and a piston consisting of the compression-valve $s^2$ and the sliding and rotary valves $s^5\ s^6$, moving in a cylinder provided with the water-ways or channels E, F, H, and R and $g'$, and controlling the same, in combination with a heater and a supply of water under pressure, substantially as arranged and described in the accompanying specification.

2. The cap G, having the passages H and R, connected with a heater B, and the passages E, F, and $g'$, in combination with the valves having the pistons $s^2\ s^5\ s^6$, substantially as described.

3. A cylinder or cap having passages connected with a water-supply pipe and a waste-pipe, further passages connected with a draft-tube, and a heater, in combination with the pistons or valves located in said cap and controlling these respective passages, substantially as set forth in the accompanying specification.

4. The combination of the cap G, having the passages E and F for the inflow and outflow of water on one side, similar passages H and R for the inflow and outflow of water on the opposite side, a heater connected with the latter passages, a draft-tube leading from the upper end of the cap, a valve having pistons $s^5\ s^6$, located in the cap for controlling the flow of water through the respective passages, and a further piston $s^2$ for controlling the flow of water through the said draft-tube, substantially as described in the accompanying specification.

CHAS. DUSTIN HUNKING.

Witnesses:
 CHAS. HANIMANN,
 WALTER WILLIAM PRICE.